United States Patent
Abe (10) Patent No.: US 9,513,618 B2
(45) Date of Patent: Dec. 6, 2016

(54) NUMERICAL CONTROLLER CAPABLE OF DISPLAYING AND INPUTTING TOOL DIRECTION RELATIVE TO WORKPIECE

(71) Applicant: FANUC Corporation, Minamitsuru-gun, Yamanashi (JP)

(72) Inventor: Kimio Abe, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 323 days.

(21) Appl. No.: 14/258,233

(22) Filed: Apr. 22, 2014

(65) Prior Publication Data

US 2014/0316553 A1    Oct. 23, 2014

(30) Foreign Application Priority Data

Apr. 23, 2013 (JP) ................ 2013-090340

(51) Int. Cl.
| | | |
|---|---|---|
| G05B 19/18 | (2006.01) |
| G05B 15/00 | (2006.01) |
| G06F 19/00 | (2011.01) |
| G01M 1/38 | (2006.01) |
| G05B 19/19 | (2006.01) |
| G05B 19/409 | (2006.01) |

(52) U.S. Cl.
CPC ............. G05B 19/19 (2013.01); G05B 19/409 (2013.01)

(58) Field of Classification Search
None
See application file for complete search history.

(56) References Cited

U.S. PATENT DOCUMENTS

| 4,503,373 A | 3/1985 | Nozawa et al. |
| 2011/0276173 A1 | 11/2011 | Otsuki et al. |
| 2015/0277419 A1* | 10/2015 | Sato ............... B23Q 15/013 700/114 |

FOREIGN PATENT DOCUMENTS

| CN | 102243486 A | 11/2011 |
| CN | 102375432 A | 3/2012 |
| JP | S57-75309 A | 5/1982 |
| JP | 63-33166 | 7/1988 |
| JP | H04271406 A | 9/1992 |
| JP | 2003-195917 A | 7/2003 |
| JP | 2005305579 A | 11/2005 |
| JP | 2005305597 A | 11/2005 |

OTHER PUBLICATIONS

Notice of Grounds for Rejection issued Oct. 14, 2014 in corresponding Japanese Patent Application No. 2013-090340 (2 pages) and English Translation (2 pages).

* cited by examiner

Primary Examiner — Adam Lee
(74) Attorney, Agent, or Firm — Drinker Biddle & Reath LLP (57) ABSTRACT

A numerical controller controls a five-axis machine which machines a workpiece mounted on a table by means of at least three linear axes and two rotation axes. The numerical controller calculates a tool direction relative to the workpiece as a tool direction vector, roll-pitch-yaw angles, or Euler angles, based on respective positions of the two rotation axes, and displays the tool direction relative to the workpiece on a display, based on the result of the calculation.

10 Claims, 9 Drawing Sheets

FIG. 4A B-AXIS AT 0°

FIG. 4B B-AXIS AT 180°

FIG. 5A B-AXIS AT 0°

FIG. 5B B-AXIS AT 180°

NUMERICAL CONTROLLER CAPABLE OF DISPLAYING AND INPUTTING TOOL DIRECTION RELATIVE TO WORKPIECE

RELATED APPLICATION DATA

This application claims priority under 35 U.S.C. §119 and/or §365 to Japanese Application No. 2013-090340 filed Apr. 23, 2013, the entire contents is incorporated herein by reference.

BACKGROUND OF THE INVENTION

Field of the Invention

The present invention relates to a numerical controller for controlling a five-axis machine having at least three linear axes and two rotation axes, and more specifically, to a numerical controller capable of displaying and inputting a tool direction relative to a workpiece. In particular, this numerical controller commands a tool center point position based on command linear axis positions on a designated program coordinate system and issues a tool direction command, thereby controlling the machine for machining. Further, the numerical controller can add a linear or rotation axis movement amount based on a manual command (by manual hand feed, jog feed, etc.) to an interpolated tool center point position, tool length compensation vector, or rotation axis positions.

Description of the Related Art

Japanese Patent Application Laid-Open No. 2003-195917 discloses a technique comprising a first interpolation unit configured to interpolate linear axes in a coordinate system defined on a table and a second interpolation unit configured to interpolate rotation axes. According to this technique, interpolation positions of the linear axes are compensated based on those of the rotation axes. In the field of five-axis machines, this technique is generally referred to as tool center point control. In five-axis machining based on the tool center point control or the like, the tool direction is designated by a rotation axis command or vector command and represented by the end point positions of the rotation axes.

Japanese Patent Application Laid-Open No. 57-75309 discloses a technique in which X-, Y-, and Z-axes are operated so that the positional relationship between a tool center point and a workpiece can be maintained as two rotation axes are operated in response to a manual command. In the field of five-axis machines, this technique is generally referred to as three-dimensional manual feed. In the three-dimensional manual feed, actual rotation axis positions are manually input, and a tool direction is represented by the end point positions of the rotation axes.

According to the techniques disclosed in Japanese Patent Applications Laid-Open Nos. 2003-195917 and 57-75309 described above, it is necessary to calculate the tool direction (rotation axis end point positions) relative to the workpiece (or table) based on the rotation axis positions and the rotation axis configuration of each machine. Thus, the tool direction relative to the workpiece cannot be obtained from information on the rotation axis positions only.

Figure 1:
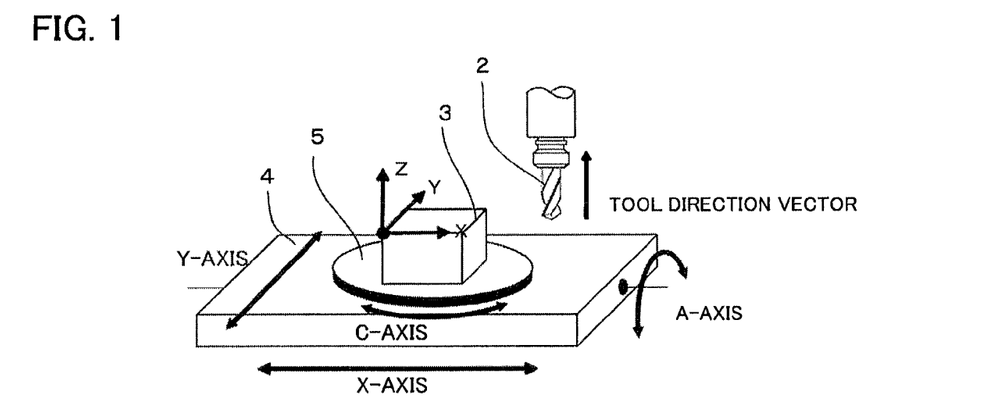
FIG. 1 is a view illustrating configurations of individual axes of a rotary-table five-axis machine.

Let us assume a rotary-table five-axis machine (with A- and C-axes as master and slave axes, respectively), such as that shown in FIG. 1. A C-axis table 5 is mounted on an A-axis table 4, and a workpiece 3 is placed on the C-axis table 5. An XYZ-coordinate system is secured to the workpiece 3. If the respective angles of the two rotation axes (A- and C-axes) are both 0°, a tool direction vector as viewed from the tables is (0, 0, 1).

Figure 2:
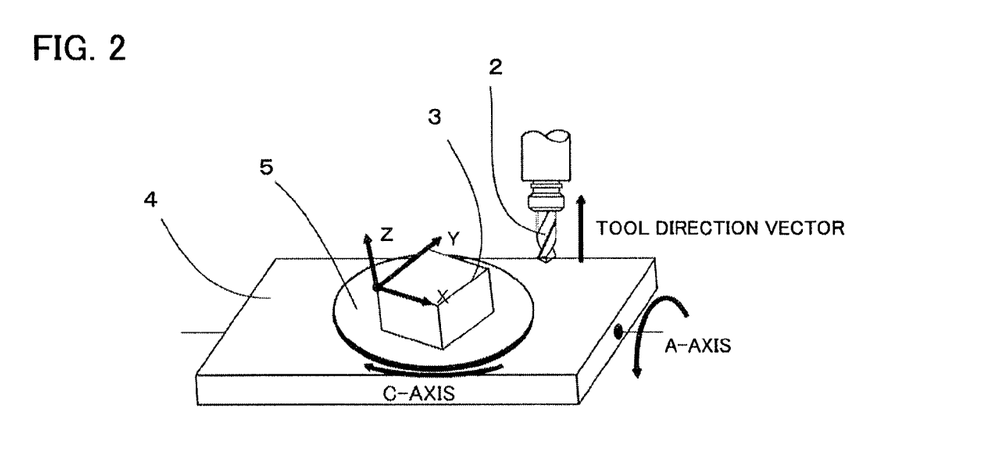
FIG. 2 is a view illustrating how A- and C-axes of the rotary-table five-axis machine are rotated.
Figure 3:
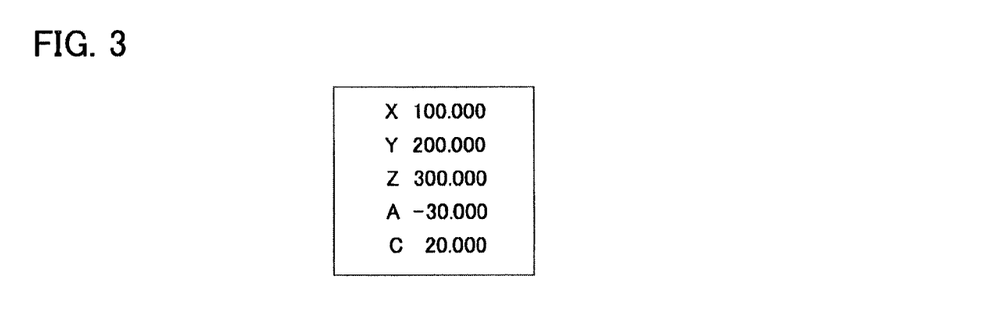
FIG. 3 is a diagram illustrating data for individual axes of the rotary-table five-axis machine.
Figure 4A:
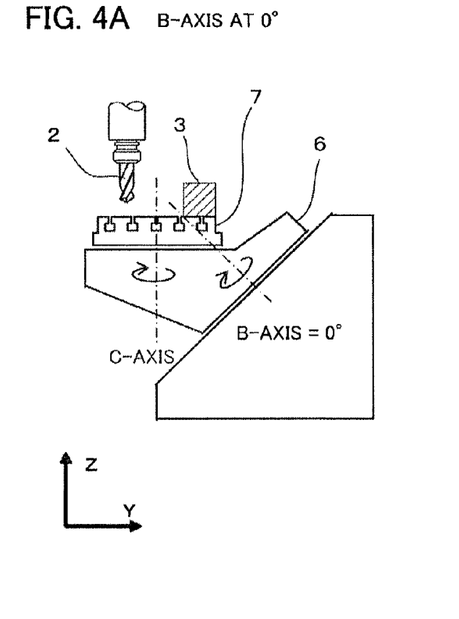
FIGS. 4A and 4B are views illustrating a machine with an inclined rotation axis, in which a C-axis table is mounted on a B-axis table, and a workpiece is placed on the C-axis table.
Figure 4B:
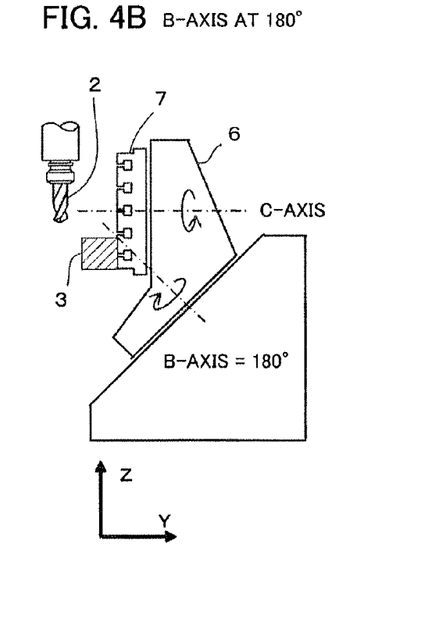

If the respective angles of the A- and C-axes are −30° and 20°, as shown in FIG. 2, however, the tool direction vector as viewed from the C-axis table 5 is (−0.171, 0.470, 0.866), which cannot be easily intuitively understood from angle information for the rotation axes (A- and C-axes). To locate the tool direction vector as viewed from the C-axis table 5, therefore, it is necessary to calculate a tool direction vector based on the rotation axis positions and the machine configuration. In calculating the tool direction (rotation axis end point positions) in a machine with an inclined rotation axis, as shown in FIGS. 4A and 4B, the inclination of the inclined rotation axis must be taken into consideration.

In the three-dimensional manual feed disclosed in Japanese Patent Application Laid-Open No. 57-75309 described above, the rotation axes can be moved so that the positional relationship between the workpiece (or table) and the tool center point is maintained. Since only one of the rotation axes can be commanded to move, however, it is necessary to change the rotation axis to be operated. Further, in the case of the machine with the inclined rotation axis, as shown in FIGS. 4A and 4B, the behavior of the workpiece (or table) caused by the rotation cannot be easily predicted.

SUMMARY OF THE INVENTION

Accordingly, in view of the problems of the prior art described above, an object of the present invention is to provide a numerical controller for controlling a five-axis machine configured to machine a workpiece mounted on a table by means of a mechanism that rotates the table or a tool head about at least three linear axes and two rotation axes, in which tool directions relative to the workpiece are displayed using a vector, roll-pitch-yaw angles, or Euler angles.

In view of the problems of the prior art described above, moreover, another object of the present invention is to provide a numerical controller for controlling a five-axis machine configured to machine a workpiece mounted on a table by means of a mechanism that rotates the table or a tool head about at least three linear axes and two rotation axes, in which a manual movement command for rotation axis movement can be issued using roll-pitch-yaw angles.

A numerical controller according to the present invention controls a five-axis machine configured to machine a workpiece mounted on a table by means of at least three linear axes and two rotation axes.

A first aspect of the numerical controller comprises a tool direction computation unit configured to calculate a tool direction relative to the workpiece as a tool direction vector, roll-pitch-yaw angles, or Euler angles, based on respective positions of the two rotation axes, and a tool direction display unit configured to display the tool direction relative to the workpiece on a display, based on the tool direction vector, the roll-pitch-yaw angles, or the Euler angles.

A second aspect of the numerical controller comprises a manual tool direction movement amount input unit, configured to input an amount of manual tool direction movement relative to the workpiece as a roll-pitch-yaw angle movement amount, and a rotation axis movement amount conversion unit configured to convert the roll-pitch-yaw angle movement amount to respective movement amounts of the two rotation axes. And the two rotation axes are driven based on the movement amounts converted by the rotation axis movement amount conversion unit.

Both the two rotation axes may be configured to serve for table rotation and the five-axis machine may be a rotary-table five-axis machine.

Both the two rotation axes may be configured to serve for tool head rotation and the five-axis machine may be a rotary-tool-head five-axis machine.

The two rotation axes may be configured to serve for table rotation and tool head rotation, individually, and the five-axis machine may be a hybrid five-axis machine having one rotation axis for table rotation and the other for tool head rotation.

One of the two rotation axes may be an inclined rotation axis not parallel to the three linear axes.

According to the present invention, there can be provided a numerical controller for controlling a five-axis machine configured to machine a workpiece mounted on a table by means of a mechanism that rotates the table or a tool head about at least three linear axes and two rotation axes, in which tool directions relative to the workpiece are displayed using a vector, roll-pitch-yaw angles, or Euler angles.

According to the present invention, moreover, there can be provided a numerical controller for controlling a five-axis machine configured to machine a workpiece mounted on a table by means of a mechanism that rotates the table or a tool head about at least three linear axes and two rotation axes, in which a manual movement command for rotation axis movement can be issued using roll-pitch-yaw angles.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

First Embodiment

A: Method of Calculating Tool Direction Vector, Roll-Pitch-Yaw Angles, and Euler Angles of Rotary-Table Five-Axis Machine with Inclined Rotation Axis FIGS. 4A and 4B show a rotary-table five-axis machine with an inclined rotation axis, in which a C-axis table 7 is mounted on a B-axis table 6, and a workpiece 3 is placed on the C-axis table 7. The workpiece 3 is machined by a tool 2. In the case of the rotary-table five-axis machine with an inclined rotation axis, as shown in FIGS. 4A and 4B, a tool direction vector, roll-pitch-yaw angles, and Euler angles are calculated.

Figure 5A:
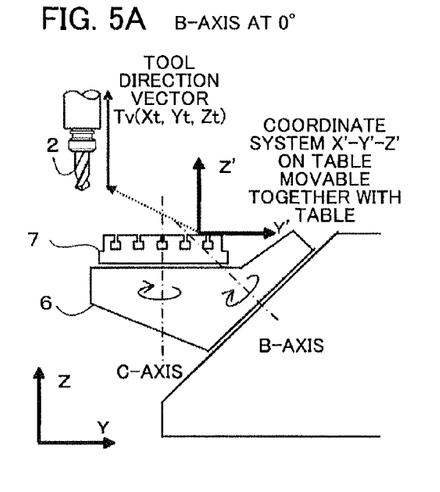
FIGS. 5A and 5B are views illustrating a tool direction vector as viewed from above a coordinate system on each table, which is movable together with the table.
Figure 5B:
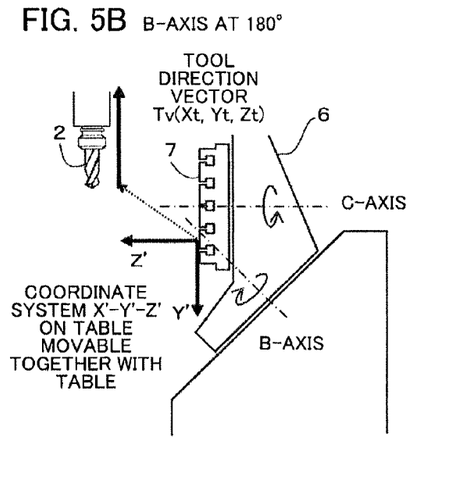

Specifically, a B-axis as a first rotation axis is assumed to be an axis rotatable about the direction of a Y-axis that is rotated minus 45 degrees about an X-axis, while a C-axis as a second rotation axis is assumed to be an axis rotatable about a Z-axis with the B-axis at 0°. The tool direction vector as viewed from above a coordinate system on each table, which is movable together with the table, is given by $Tv((Xt, Yt, Zt)^T)$ (see FIGS. 5A and 5B). A tool direction vector, roll-pitch-yaw angles, or Euler angles that are separately set are selected, and the following processing steps A-1, A-2 and A-3 are performed.

A-1: Method of Calculating Tool Direction Vector

When the B- and C-axes, rotation axes, are in positions B and C, respectively, in this machine configuration, the tool direction vector $Tv((Xt, Yt, Zt)^T)$ can be given by equation (1) as follows:

$$\begin{bmatrix} Xt \\ Yt \\ Zt \end{bmatrix} = Rc * Ra(-45°) * Rb * Ra(45°) * \begin{bmatrix} 0 \\ 0 \\ 1 \end{bmatrix} \quad (1)$$

$$Rb = \begin{bmatrix} \cos B & 0 & \sin B \\ 0 & 1 & 0 \\ -\sin B & 0 & \cos B \end{bmatrix},$$

$$Rc = \begin{bmatrix} \cos C & -\sin C & 0 \\ \sin C & \cos C & 0 \\ 0 & 0 & 1 \end{bmatrix},$$

$$Ra(\pm 45°) = \begin{bmatrix} 1 & 0 & 0 \\ 0 & \cos(\pm 45°) & -\sin(\pm 45°) \\ 0 & \sin(\pm 45°) & \cos(\pm 45°) \end{bmatrix}$$

Figure 6:
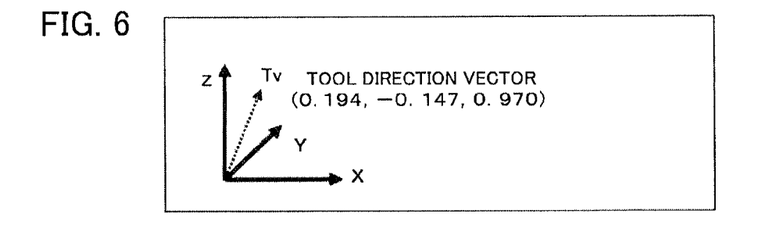
FIG. 6 is a diagram illustrating a first example of a tool direction vector for the workpiece.

The tool direction relative to the workpiece can be more easily intuitively understood by displaying the X, Y and Z components of the tool direction vector calculated in this manner and the tool direction vector on the coordinate system movable together with each table. FIG. 6 indicates that the tool direction vector for the workpiece with B=20.0 and C=−30.0 is Tv(0.194, −0.147, 0.970).

A-2: Method of Calculating Roll-Pitch-Yaw Angles

A roll angle I, pitch angle J, and yaw angle K represent, respectively, rotations about the X-, Y-, and Z-axes of the coordinate system movable together with each table. Here the rotations about the X-, Y-, and Z-axes are expected to be made in this order. The tool direction vector $Tv((Xt, Yt, Zt)^T)$ based on the roll-pitch-yaw angles is given by equation (2) as follows:

$$\begin{bmatrix} Xt \\ Yt \\ Zt \end{bmatrix} = Rk * Rj * Ri * \begin{bmatrix} 0 \\ 0 \\ 1 \end{bmatrix} \quad (2)$$

$$Ri = \begin{bmatrix} 1 & 0 & 0 \\ 0 & \cos I & -\sin I \\ 0 & \sin I & \cos I \end{bmatrix}$$

$$Rj = \begin{bmatrix} \cos J & 0 & \sin J \\ 0 & 1 & 0 \\ -\sin J & 0 & \cos J \end{bmatrix}$$

$$Rk = \begin{bmatrix} \cos K & -\sin K & 0 \\ \sin K & \cos K & 0 \\ 0 & 0 & 1 \end{bmatrix}$$

The roll, pitch, and yaw angles are individually obtained by comparing and solving the components of equations (1) and (2) given above. Since there are a plurality of combinations of the roll-pitch-yaw angles that implement the tool direction vector Tv, the roll angle may be fixed at 0° for the calculation.

The tool direction relative to the workpiece 3 can be more easily intuitively understood by displaying the roll-pitch-yaw angles of the tool direction vector calculated in this manner and the tool direction vector on the coordinate system movable together with each table.

Figure 7:
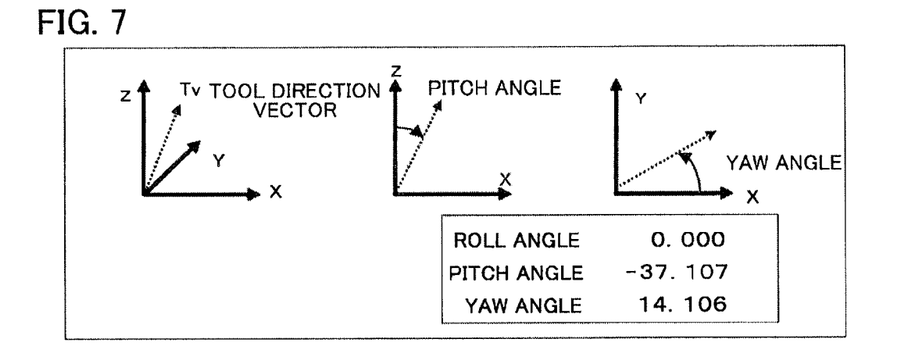
FIG. 7 is a diagram illustrating a second example of the tool direction vector for the workpiece.

FIG. 7 shows the tool direction vector for the workpiece with B=20.0 and C=−30.0, as in the case of the calculation of the tool direction vector, and indicates that the roll, pitch, and yaw angles are given by 0°, −37.107°, and 14.106°, respectively. FIG. 7 also illustrates the degree to which the tool direction vector rotates based on the pitch and yaw angles.

A-3: Method of Calculating Euler Angles

Conversion of Euler angles (P, Q, R) is defined in the following manner.

A coordinate system 2 is assumed to be obtained by rotating a certain coordinate system 1 by P about the Z-axis. A coordinate system 3 is assumed to be obtained by rotating the coordinate system 2 by Q about the X-axis. A coordinate system 4 is assumed to be obtained by rotating the coordinate system 3 by R about the Z-axis. Conversion of the certain coordinate system 1 to the coordinate system 4 based on this definition is referred to as Euler angle conversion. The tool direction vector $Tv((Xt, Yt, Zt)^T)$ based on the Euler angle is given by equation (3) as follows:

$$\begin{bmatrix} Xt \\ Yt \\ Zt \end{bmatrix} = Rp * Rq * Rr * \begin{bmatrix} 0 \\ 0 \\ 1 \end{bmatrix} \quad (3)$$

$$Rp = \begin{bmatrix} \cos P & -\sin P & 0 \\ \sin P & \cos P & 0 \\ 0 & 0 & 1 \end{bmatrix}$$

$$Rq = \begin{bmatrix} 1 & 0 & 0 \\ 0 & \cos Q & -\sin Q \\ 0 & \sin Q & \cos Q \end{bmatrix}$$

$$Rr = \begin{bmatrix} \cos R & -\sin R & 0 \\ \sin R & \cos R & 0 \\ 0 & 0 & 1 \end{bmatrix}$$

The Euler angles (P, Q, R) are individually obtained by comparing and solving the components of equations (1) and (3) given above. Since the Euler angle R does not affect the tool direction vector, it can be assumed to be 0°.

Figure 8:
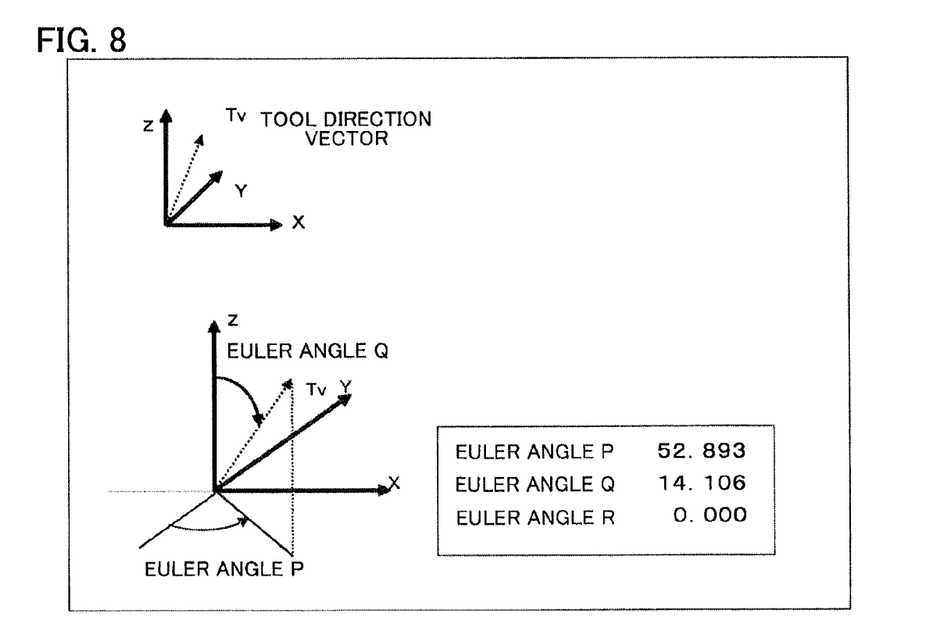
FIG. 8 is a diagram illustrating a third example of the tool direction vector for the workpiece.

The tool direction relative to the workpiece 3 can be more easily intuitively understood by displaying the Euler angles (P, Q, R) of the tool direction vector calculated in this manner and the tool direction vector on the coordinate system movable together with each table. FIG. 8 shows the tool direction vector for the workpiece with B=20.0 and C=−30.0, as in the case of the calculation of the tool direction vector, and indicates that the Euler angles P, Q and R are given by 52.893°, 14.106°, and 0°, respectively. FIG. 8 also illustrates the degree to which the tool direction vector rotates based on the Euler angles P and Q.

In the case of a machine configuration without an inclined rotation axis, as shown in FIG. 1, it is necessary only that a matrix Ra (±45°) of equation (1) be omitted.

Second Embodiment

B: Roll-Pitch-Yaw Angle Commands for Manual Operation of Rotary-Table Five-Axis Machine with Inclined Rotation Axis B-1: Machine Configuration and Method of Calculating Rotation Axis Position A calculation is performed for the case of a rotary-table five-axis machine with an inclined rotation axis, as shown in FIGS. 4A and 4B. Specifically, a B-axis as a first rotation axis is assumed to be an axis rotatable about the direction of a Y-axis that is rotated at −45° about an X-axis, while a C-axis as a second rotation axis is assumed to be an axis rotatable about a Z-axis with the B-axis at 0°. A tool direction vector as viewed from above a coordinate system on each table, which is movable together with the table, is given by $Tv((Xt, Yt, Zt)^T)$. Tv is calculated using equation (1) (see FIGS. 5A and 5B).

The tool is manually rotated in a selected one of the directions about the X-axis (for rolling), Y-axis (for pitching), and Z-axis (for yawing) of the machine coordinate system. If the tool direction vector after rotation is $T'v((X't, Y't, Z't)^T)$, tool direction vectors T'v based on rotations by ΔI, ΔJ or ΔK about the X-, Y- and Z-axes can be given individually by equations (4), (5) and (6) as follows:

$$\begin{bmatrix} X't \\ Y't \\ Z't \end{bmatrix} = \begin{bmatrix} 1 & 0 & 0 \\ 0 & \cos \Delta I & -\sin \Delta I \\ 0 & \sin \Delta I & \cos \Delta I \end{bmatrix} \begin{bmatrix} Xt \\ Yt \\ Zt \end{bmatrix} \quad (4)$$

$$\begin{bmatrix} X't \\ Y't \\ Z't \end{bmatrix} = \begin{bmatrix} \cos \Delta J & 0 & \sin \Delta J \\ 0 & 1 & 0 \\ -\sin \Delta J & 0 & \cos \Delta J \end{bmatrix} \begin{bmatrix} Xt \\ Yt \\ Zt \end{bmatrix} \quad (5)$$

$$\begin{bmatrix} X't \\ Y't \\ Z't \end{bmatrix} = \begin{bmatrix} \cos \Delta K & -\sin \Delta K & 0 \\ \sin \Delta K & \cos \Delta K & 0 \\ 0 & 0 & 1 \end{bmatrix} \begin{bmatrix} Xt \\ Yt \\ Zt \end{bmatrix} \quad (6)$$

To implement the tool direction vector T'v calculated in this manner, the respective positions of the rotary B- and C-axes are obtained by solving equation (7) as follows:

$$\begin{bmatrix} X't \\ Y't \\ Z't \end{bmatrix} = Rc * Ra(-45°) * Rb * Ra(45°) * \begin{bmatrix} 0 \\ 0 \\ 1 \end{bmatrix} \quad (7)$$

$$Rb = \begin{bmatrix} \cos B & 0 & \sin B \\ 0 & 1 & 0 \\ -\sin B & 0 & \cos B \end{bmatrix},$$

$$Rc = \begin{bmatrix} \cos C & -\sin C & 0 \\ \sin C & \cos C & 0 \\ 0 & 0 & 1 \end{bmatrix},$$

$$Ra(\pm 45°) = \begin{bmatrix} 1 & 0 & 0 \\ 0 & \cos(\pm 45°) & -\sin(\pm 45°) \\ 0 & \sin(\pm 45°) & \cos(\pm 45°) \end{bmatrix}$$

Thus, the operation for $\Delta I$, $\Delta J$ or $\Delta K$ can be achieved by moving the B- and C-axes to their respective obtained positions.

Equation (1) is calculated in the same manner as in the first embodiment, and equations (1) and (7) share the same right side. Thus, the first and second embodiments are inseparable techniques with many common parts.

Third Embodiment

Figure 9:
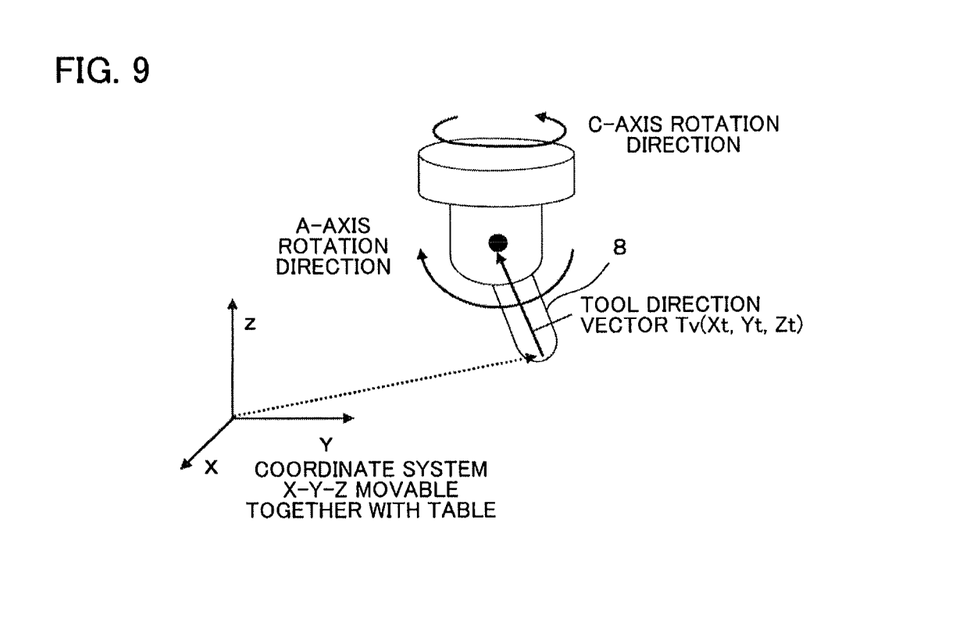
FIG. 9 is a view illustrating a tool direction vector as viewed from above a coordinate system on each table, which is movable together with the table.

C: Method of Calculating Tool Direction Vector, Roll-Pitch-Yaw Angles, and Euler Angles of Rotary-Tool-Head Five-Axis Machine A calculation is performed for the case of a rotary-tool-head five-axis machine. Specifically, a C-axis as a first rotation axis is assumed to be an axis rotatable about a Z-axis, while an A-axis as a second rotation axis is assumed to be an axis rotatable about an X-axis with the C-axis at 0°. A tool direction vector of a tool 8 as viewed from above a coordinate system on each table, which is movable together with the table, is given by $Tv((Xt, Yt, Zt)^T)$ (FIG. 9). A tool direction vector, roll-pitch-yaw angles, or Euler angles that are separately set are selected, and the following processing steps C-1, C-2 and C-3 are performed.

C-1: Method of Calculating Tool Direction Vector

When the C- and A-axes, rotation axes, are in positions C and A, respectively, in this machine configuration, the tool direction vector $Tv((Xt, Yt, Zt)^T)$ can be given by equation (8) as follows:

$$\begin{bmatrix} Xt \\ Yt \\ Zt \end{bmatrix} = Rc * Ra * \begin{bmatrix} 0 \\ 0 \\ 1 \end{bmatrix} \quad (8)$$

$$Ra = \begin{bmatrix} 1 & 0 & 0 \\ 0 & \cos A & -\cos A \\ 0 & \cos A & \cos A \end{bmatrix},$$

$$Rc = \begin{bmatrix} \cos C & -\sin C & 0 \\ \sin C & \cos C & 0 \\ 0 & 0 & 1 \end{bmatrix}$$

The tool direction relative to the workpiece can be more easily intuitively understood by displaying the X, Y and Z components of the tool direction vector calculated in this manner and the tool direction vector on the coordinate system movable together with each table (see FIG. 6).

C-2: Method of Calculating Roll-Pitch-Yaw Angles

A roll angle I, pitch angle J, and yaw angle K represent, respectively, rotations about X-, Y-, and Z-axes of the machine coordinate system, which are expected to be made in this order. The tool direction vector $Tv((Xt, Yt, Zt)^T)$ based on the roll-pitch-yaw angles is given by equation (9) as follows:

$$\begin{bmatrix} Xt \\ Yt \\ Zt \end{bmatrix} = Rk * Rj * Ri * \begin{bmatrix} 0 \\ 0 \\ 1 \end{bmatrix} \quad (9)$$

$$Ri = \begin{bmatrix} 1 & 0 & 0 \\ 0 & \cos I & -\sin I \\ 0 & \sin I & \cos I \end{bmatrix}$$

$$Rj = \begin{bmatrix} \cos J & 0 & \sin J \\ 0 & 1 & 0 \\ -\sin J & 0 & \cos J \end{bmatrix}$$

$$Rk = \begin{bmatrix} \cos K & -\sin K & 0 \\ \sin K & \cos K & 0 \\ 0 & 0 & 1 \end{bmatrix}$$

The roll, pitch, and yaw angles are individually obtained by comparing and solving the components of equations (8) and (9) given above. Since there are a plurality of combinations of the roll-pitch-yaw angles that implement the tool direction vector Tv, the roll angle may be fixed at 0° for the calculation.

The tool direction relative to the workpiece 3 can be more easily intuitively understood by displaying the roll-pitch-yaw angles of the tool direction vector calculated in this manner and the tool direction vector on the coordinate system movable together with each table (see FIG. 7).

C-3: Method of Calculating Euler Angles

Conversion of Euler angles (P, Q, R) is defined in the following manner.

A coordinate system 2 is assumed to be obtained by rotating a certain coordinate system 1 by P about the Z-axis. A coordinate system 3 is assumed to be obtained by rotating the coordinate system 2 by Q about the X-axis. A coordinate system 4 is assumed to be obtained by rotating the coordinate system 3 by R about the Z-axis. Conversion of the certain coordinate system 1 to the coordinate system 4 based on this definition is referred to as Euler angle conversion. The tool direction vector $Tv((Xt, Yt, Zt)^T)$ based on the Euler angle is given by equation (10) as follows:

$$\begin{bmatrix} Xt \\ Yt \\ Zt \end{bmatrix} = Rp * Rq * Rr * \begin{bmatrix} 0 \\ 0 \\ 1 \end{bmatrix} \quad (10)$$

$$Rp = \begin{bmatrix} \cos P & -\sin P & 0 \\ \sin P & \cos P & 0 \\ 0 & 0 & 1 \end{bmatrix}$$

$$Rq = \begin{bmatrix} 1 & 0 & 0 \\ 0 & \cos Q & -\sin Q \\ 0 & \sin Q & \cos Q \end{bmatrix}$$

$$Rr = \begin{bmatrix} \cos R & -\sin R & 0 \\ \sin R & \cos R & 0 \\ 0 & 0 & 1 \end{bmatrix}$$

The Euler angles (P, Q, R) are individually obtained by comparing and solving the components of equations (8) and (10) given above. Since the Euler angle R does not affect the tool direction vector, it can be assumed to be 0°.

The tool direction relative to the workpiece 3 can be more easily intuitively understood by displaying the Euler angles (P, Q, R) of the tool direction vector calculated in this manner and the tool direction vector on the coordinate system movable together with each table (see FIG. 8).

Fourth Embodiment

Figure 10:
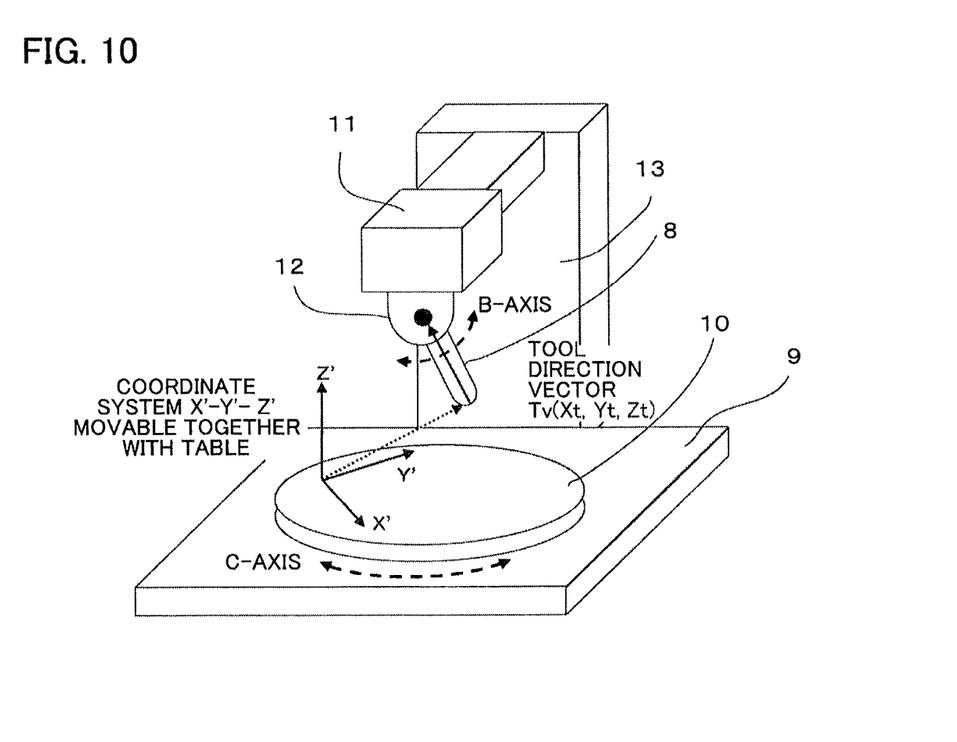
FIG. 10 is a view illustrating a hybrid five-axis machine.

D: Method of Calculating Tool Direction Vector, Roll-Pitch-Yaw Angles, and Euler Angles of Hybrid Five-Axis Machine A calculation is performed for the case of a hybrid five-axis machine. Specifically, a B-axis as a tool rotation axis is assumed to be an axis rotatable about a Y-axis, while a C-axis as a table rotation axis is assumed to be an axis rotatable about a Z-axis. A tool direction vector as viewed from above a coordinate system on each table, which is movable together with the table, is given by $Tv((Xt, Yt, Zt)^T)$ (FIG. 10). A C-axis table 10 is mounted on a table 9, and a workpiece (not shown) is secured to the C-axis table 10. A Z-axis head 11 is attached to a column 13, and a B-axis 12 mounted with a tool 8 is attached to the Z-axis head 11. A tool direction vector, roll-pitch-yaw angles, or Euler angles that are separately set are selected, and the following processing steps D-1, D-2 and D-3 are performed.

D-1: Method of Calculating Tool Direction Vector

When the B- and C-axes, rotation axes, are in positions B and C, respectively, in this machine configuration, the tool direction vector $Tv((Xt, Yt, Zt)^T)$ can be given by equation (11) as follows:

$$\begin{bmatrix} Xt \\ Yt \\ Zt \end{bmatrix} = Rc * Rb * \begin{bmatrix} 0 \\ 0 \\ 1 \end{bmatrix} \quad (11)$$

$$Rb = \begin{bmatrix} \cos B & 0 & \sin B \\ 0 & 1 & 0 \\ -\sin B & 0 & \cos B \end{bmatrix},$$

$$Rc = \begin{bmatrix} \cos C & -\sin C & 0 \\ \sin C & \cos C & 0 \\ 0 & 0 & 1 \end{bmatrix}$$

The tool direction relative to the workpiece can be more easily intuitively understood by displaying the X, Y and Z components of the tool direction vector calculated in this manner and the tool direction vector on the coordinate system movable together with each table (FIG. 6).

D-2: Method of Calculating Roll-Pitch-Yaw Angles

A roll angle I, pitch angle J, and yaw angle K represent, respectively, rotations about X-, Y-, and Z-axes of the machine coordinate system, which are expected to be made in this order. The tool direction vector $Tv((Xt, Yt, Zt)^T)$ based on the roll-pitch-yaw angles is given by equation (12) as follows:

$$\begin{bmatrix} Xt \\ Yt \\ Zt \end{bmatrix} = Rk * Rj * Ri * \begin{bmatrix} 0 \\ 0 \\ 1 \end{bmatrix} \quad (12)$$

-continued $$Ri = \begin{bmatrix} 1 & 0 & 0 \\ 0 & \cos I & -\sin I \\ 0 & \sin I & \cos I \end{bmatrix}$$

$$Rj = \begin{bmatrix} \cos J & 0 & \sin J \\ 0 & 1 & 0 \\ -\sin J & 0 & \cos J \end{bmatrix}$$

$$Rk = \begin{bmatrix} \cos K & -\sin K & 0 \\ \sin K & \cos K & 0 \\ 0 & 0 & 1 \end{bmatrix}$$

The roll, pitch, and yaw angles are individually obtained by comparing and solving the components of equations (11) and (12) given above. Since there are a plurality of combinations of the roll-pitch-yaw angles that implement the tool direction vector Tv, the roll angle may be fixed at 0° for the calculation.

The tool direction relative to the workpiece 3 can be more easily intuitively understood by displaying the roll-pitch-yaw angles of the tool direction vector calculated in this manner and the tool direction vector on the coordinate system movable together with each table (see FIG. 7).

D-3: Method of Calculating Euler Angles

Conversion of Euler angles (P, Q, R) is defined in the following manner.

A coordinate system 2 is assumed to be obtained by rotating a certain coordinate system 1 by P about the Z-axis. A coordinate system 3 is assumed to be obtained by rotating the coordinate system 2 by Q about the X-axis. A coordinate system 4 is assumed to be obtained by rotating the coordinate system 3 by R about the Z-axis. Conversion of the certain coordinate system 1 to the coordinate system 4 based on this definition is referred to as Euler angle conversion. The tool direction vector $Tv((Xt, Yt, Zt)^T)$ based on the Euler angle is given by equation (13) as follows:

$$\begin{bmatrix} Xt \\ Yt \\ Zt \end{bmatrix} = Rp * Rq * Rr * \begin{bmatrix} 0 \\ 0 \\ 1 \end{bmatrix} \quad (13)$$

$$Rp = \begin{bmatrix} \cos P & -\sin P & 0 \\ \sin P & \cos P & 0 \\ 0 & 0 & 1 \end{bmatrix}$$

$$Rq = \begin{bmatrix} 1 & 0 & 0 \\ 0 & \cos Q & -\sin Q \\ 0 & \sin Q & \cos Q \end{bmatrix}$$

$$Rr = \begin{bmatrix} \cos R & -\sin R & 0 \\ \sin R & \cos R & 0 \\ 0 & 0 & 1 \end{bmatrix}$$

The Euler angles (P, Q, R) are individually obtained by comparing and solving the components of equations (11) and (13) given above. Since the Euler angle R does not affect the tool direction vector, it can be assumed to be 0°.

The tool direction relative to the workpiece 3 can be more easily intuitively understood by displaying the Euler angles (P, Q, R) of the tool direction vector calculated in this manner and the tool direction vector on the coordinate system movable together with each table (FIG. 8).

Figure 11:
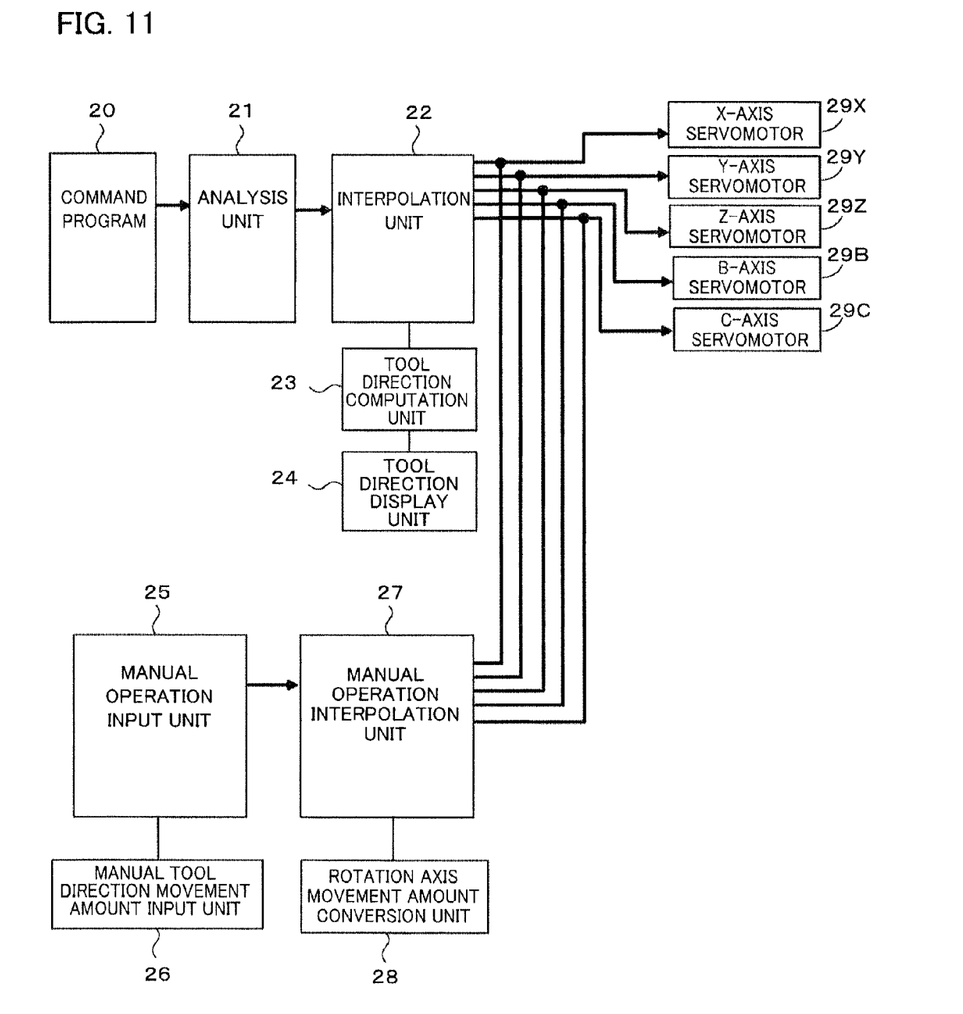
FIG. 11 is a block diagram of a numerical controller for controlling the machine.

A numerical controller according to the present invention will now be described with reference to FIG. 11.

A numerical controller 30 analyzes and interpolates a command program 20 in an analysis unit 21 and an interpolation unit 22, respectively, and drives servomotors for the individual axes (X-axis servomotor 29X, Y-axis servomotor 29Y, Z-axis servomotor 29Z, B-axis servomotor 29B, and C-axis servomotor 29C). This configuration is a conventional one for a numerical controller.

In the numerical controller 30 according to the present invention, a tool direction computation unit 23 and a tool direction display unit 24 are connected to the interpolation unit 22. Generally, in the case of manual operation, a manual operation interpolation unit 27 receives a command for handle feed or jog feed from a manual operation input unit 25 and activates the servomotors 29X, 29Y, 29Z, 29B and 29C for each interpolation cycle. A manual tool direction movement amount input unit 26 and a rotation axis movement amount conversion unit 28 are connected to the manual operation input unit 25 and the manual operation interpolation unit 27, respectively. As mentioned before, the tool direction computation unit 23 and the rotation axis movement amount conversion unit 28 share parts in common and are inseparable.

Figure 12:
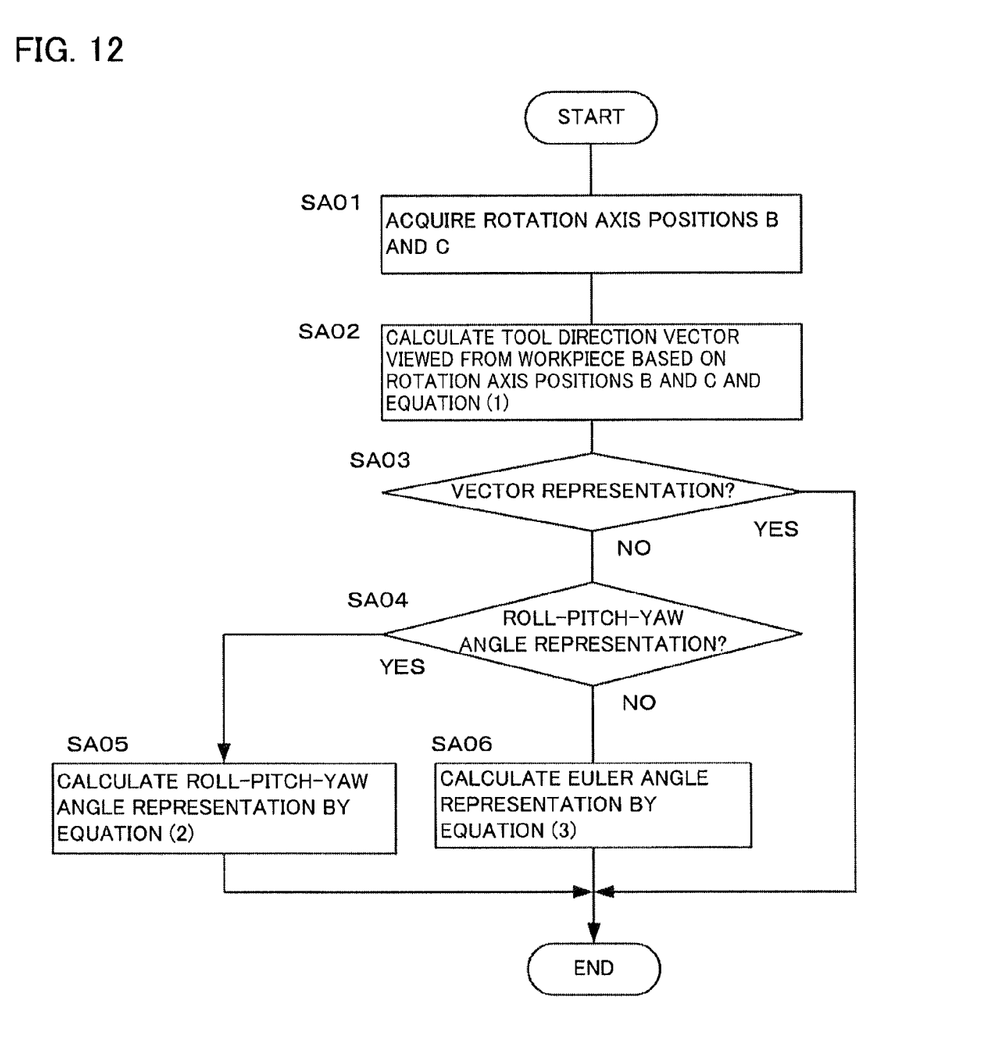
FIG. 12 is a flowchart showing processing by a tool direction computation unit according to Embodiment 1.

Processing according to the individual embodiments will now be described with reference to flowcharts. FIG. 12 is a flowchart showing processing by a tool direction computation unit 23 according to Embodiment 1. The processing is explained below according to respective steps.

[Step SA01] The positions (rotation axis positions) B and C of the rotary B- and C-axes are acquired.

[Step SA02] The tool direction vector as viewed from the workpiece is calculated based on the rotation axis positions B and C and equation (1).

[Step SA03] It is determined whether or not to display the tool direction relative to the workpiece in vector representation on the display unit. If the tool direction is displayed in vector representation (YES), this processing ends. If not (NO), the program proceeds to Step SA04.

[Step SA04] It is determined whether or not to display the tool direction relative to the workpiece in roll-pitch-yaw angle representation on the display unit. If the tool direction is displayed in roll-pitch-yaw angle representation (YES), the program proceeds to Step SA05. If not (NO), the program proceeds to Step SA06.

[Step SA05] A method of displaying the tool direction relative to the workpiece in roll-pitch-yaw angle representation is calculated by equation (2), whereupon this processing ends.

[Step SA06] A method of displaying the tool direction relative to the workpiece in Euler angle representation is calculated by equation (3), whereupon this processing ends.

Figure 13:
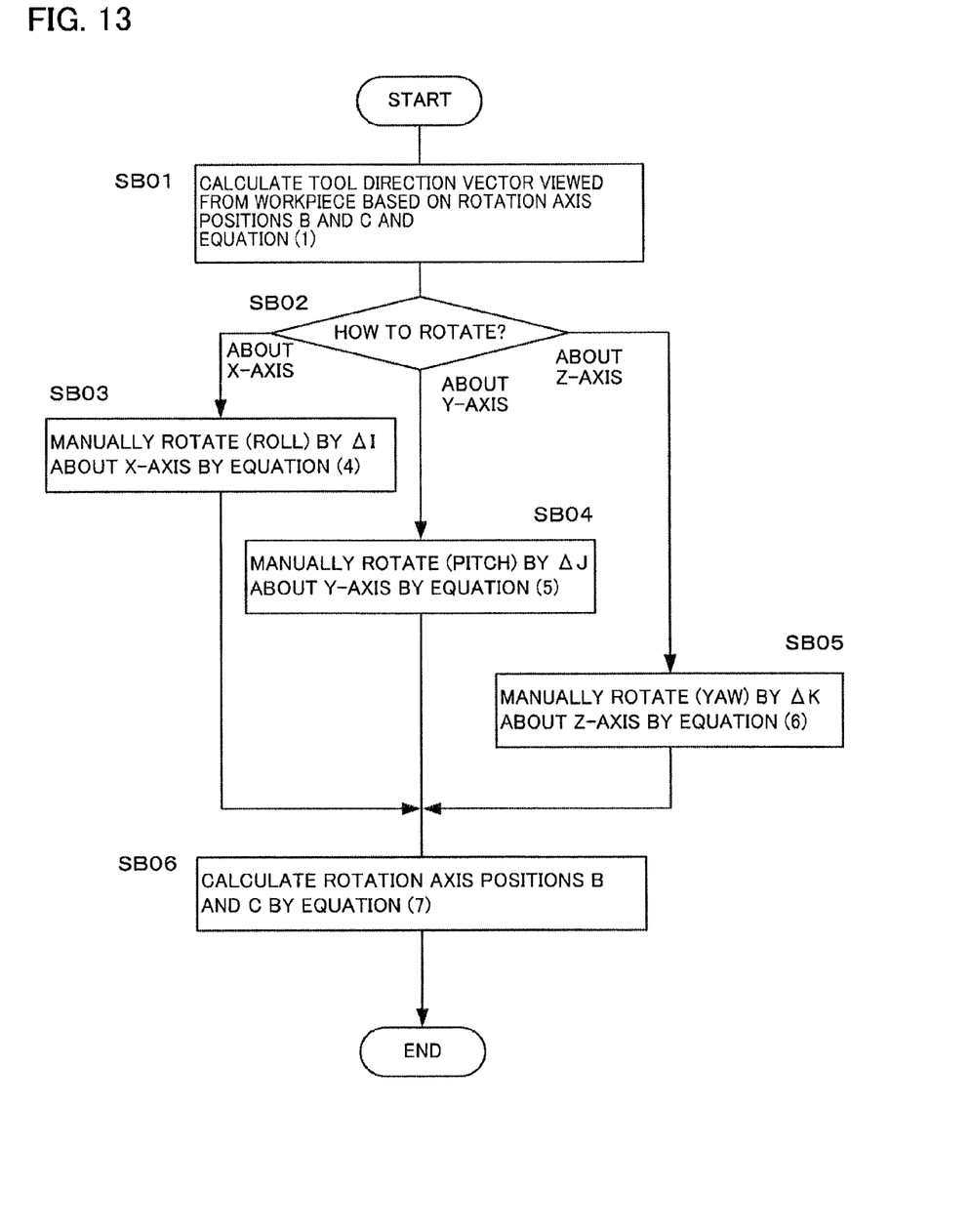
FIG. 13 is a flowchart showing processing by a rotation axis movement amount conversion unit according to Embodiment 2.

FIG. 13 is a flowchart showing processing by a rotation axis movement amount conversion unit 28 according to Embodiment 2. The processing is explained below according to respective steps.

[Step SB01] The tool direction vector as viewed from the workpiece is calculated based on the positions (rotation axis positions) B and C of the rotary B- and C-axes and equation (1).

[Step SB02] Whether the direction of rotation is about the X-axis, Y-axis, or Z-axis is determined. If the direction of rotation is about the X-axis, the program proceeds to Step SB03. If the direction of rotation is about the Y-axis, the program proceeds to Step SB04. If the direction of rotation is about the Z-axis, the program proceeds to Step SB05.

[Step SB03] The tool is manually rotated by $\Delta I$ about the X-axis (roll) according to equation (4), whereupon the program proceeds to Step SB06.

[Step SB04] The tool is manually rotated by $\Delta J$ about the Y-axis (pitch) according to equation (5), whereupon the program proceeds to Step SB06.

[Step SB05] The tool is manually rotated by $\Delta K$ about the Z-axis (to yaw) according to equation (6), whereupon the program proceeds to Step SB06.

[Step SB06] The rotation axis positions B and C are calculated by equation (7), whereupon the processing ends.

Figure 14:
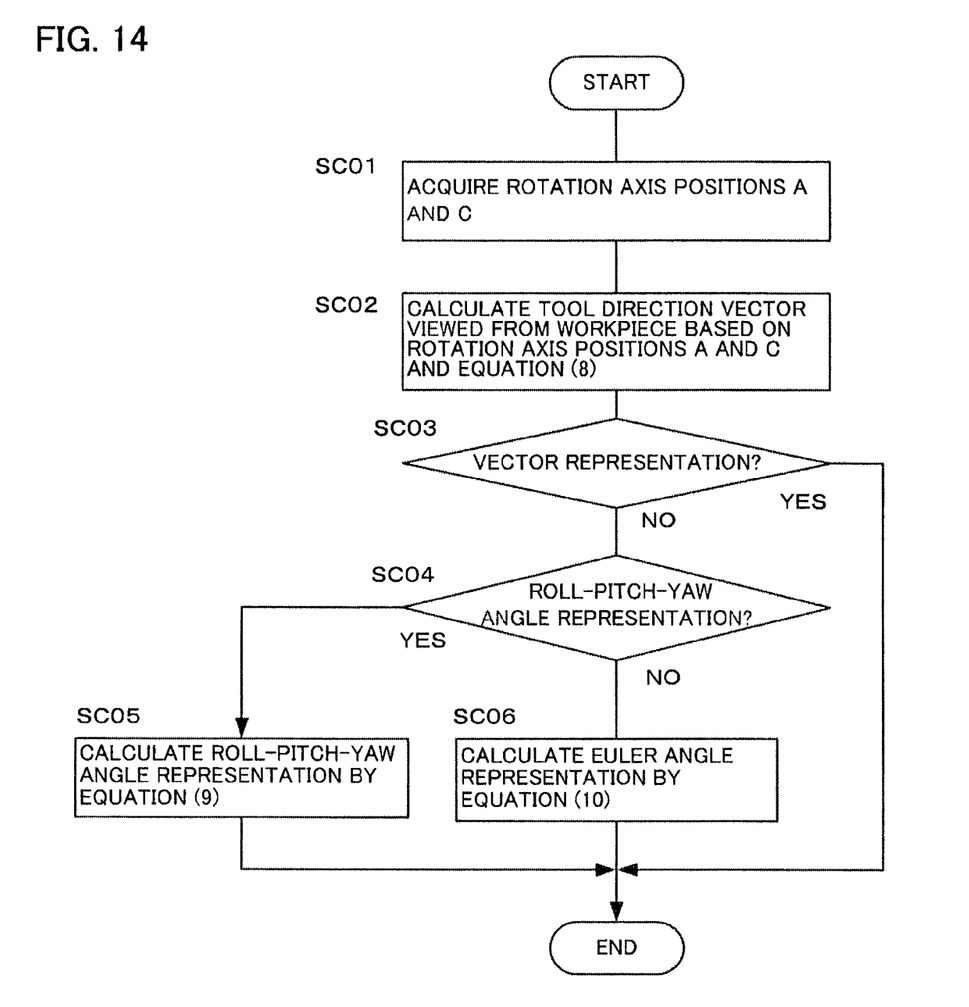
FIG. 14 is a flowchart showing processing by a tool direction computation unit according to Embodiment 3.

FIG. 14 is a flowchart showing processing by a tool direction computation unit 23 according to Embodiment 3. The processing is explained below according to respective steps.

[Step SC01] The positions (rotation axis positions) A and C of the rotary A- and C-axes are acquired.

[Step SC02] The tool direction vector as viewed from the workpiece is calculated based on the rotation axis positions A and C and equation (8).

[Step SC03] It is determined whether or not to display the tool direction relative to the workpiece in vector representation on the display unit. If the tool direction is displayed in vector representation (YES), this processing ends. If not (NO), the program proceeds to Step SC04.

[Step SC04] It is determined whether or not to display the tool direction relative to the workpiece in roll-pitch-yaw angle representation on the display unit. If the tool direction is displayed in roll-pitch-yaw angle representation (YES), the program proceeds to Step SC05. If not (NO), the program proceeds to Step SC06.

[Step SC05] A method of displaying the tool direction relative to the workpiece in roll-pitch-yaw angle representation is calculated by equation (9), whereupon this processing ends.

[Step SC06] A method of displaying the tool direction relative to the workpiece in Euler angle representation is calculated by equation (10), whereupon this processing ends.

Figure 15:
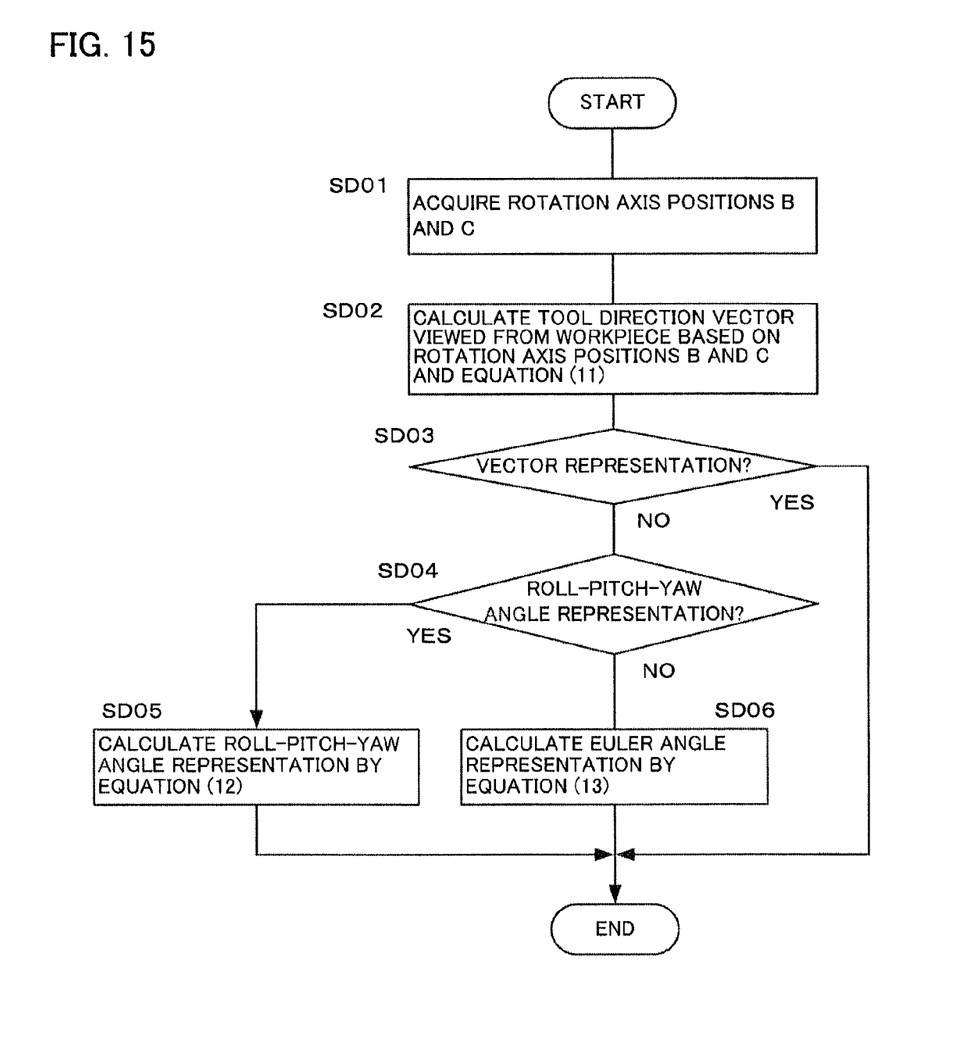
FIG. 15 is a flowchart showing processing by a tool direction computation unit according to Embodiment 4.

FIG. 15 is a flowchart showing processing by a tool direction computation unit 23 according to Embodiment 4. The processing is explained below according to respective steps.

[Step SD01] The positions (rotation axis positions) B and C of the rotary B- and C-axes are obtained.

[Step SD02] The tool direction vector as viewed from the workpiece is calculated based on the rotation axis positions B and C and equation (11).

[Step SD03] It is determined whether or not to display the tool direction relative to the workpiece in vector representation on the display unit. If the tool direction is displayed in vector representation (YES), this processing ends. If not (NO), the program proceeds to Step SD04.

[Step SD04] It is determined whether or not to display the tool direction relative to the workpiece in roll-pitch-yaw angle representation on the display unit. If the tool direction is displayed in roll-pitch-yaw angle representation (YES), the program proceeds to Step SD05. If not (NO), the program proceeds to Step SD06.

[Step SD05] A method of displaying the tool direction relative to the workpiece in roll-pitch-yaw angle representation is calculated by equation (12), whereupon this processing ends.

[Step SD06] A method of displaying the tool direction relative to the workpiece in Euler angle representation is calculated by equation (13), whereupon this processing ends.

The invention claimed is:

1. A numerical controller for controlling a five-axis machine configured to machine a workpiece mounted on a table by means of at least three linear axes and two rotation axes, the numerical controller comprising:
- a tool direction computation unit configured to calculate a tool direction relative to the workpiece as a tool direction vector representation, a roll-pitch-yaw angle representation, or an Euler angle representation, based on respective positions of the two rotation axes; and
- a tool direction display unit configured to display the tool direction relative to the workpiece on a display, based on the tool direction vector representation, the roll-pitch-yaw angle representation, or the Euler angle representation which is calculated by the tool direction computation unit, wherein
- if the tool direction vector representation is to be displayed, the tool direction computation unit is configured to calculate the tool direction relative to the workpiece as the tool direction vector representation, and the tool direction display unit is configured to display the tool direction vector representation relative to the workpiece,
- if the tool direction vector representation is to not be displayed and if the roll-pitch-yaw angle representation is to be displayed, the tool direction computation unit is configured to calculate the tool direction relative to the workpiece as the roll-pitch-yaw angle representation and the tool direction display unit is configured to display the roll-pitch-yaw angle representation relative to the workpiece, and
- if the tool direction vector representation is to not be displayed and the roll-pitch-yaw angle representation is to not be displayed, the tool direction computation unit is configured to calculate the tool direction relative to the workpiece as the Euler angle representation and the tool direction display unit is configured to display the Euler angle representation relative to the workpiece.

2. A numerical controller for controlling a five-axis machine configured to machine a workpiece mounted on a table by means of at least three linear axes and two rotation axes, the numerical controller comprising:
- a manual tool direction movement amount input unit configured to input an amount of manual tool direction movement relative to the workpiece as a roll-pitch-yaw angle movement amount; and
- a rotation axis movement amount conversion unit configured to convert the roll-pitch-yaw angle movement amount, input by the manual tool direction movement amount input, to a tool direction vector, wherein
  - if the manual tool direction movement is about a roll axis, the rotation axis movement amount conversion unit is configured to calculate a tool direction vector by converting the movement about the roll axis,
  - if the manual tool direction movement is about a pitch axis, the rotation axis movement amount conversion unit is configured to calculate a tool direction vector by converting the movement about the pitch axis, and
  - if the manual tool direction movement is about a yaw axis, the rotation axis movement amount conversion unit is configured to calculate a tool direction vector by converting the movement about the yaw axis, and
  - the respective movement amounts of the two rotation axes are driven based on the tool direction vector calculated by the rotation axis movement amount conversion unit.

3. The numerical controller according to claim 1, wherein both the two rotation axes serve for table rotation and the five-axis machine is a rotary-table five-axis machine.

4. The numerical controller according to claim 1, wherein both the two rotation axes serve for tool head rotation and the five-axis machine is a rotary-tool-head five-axis machine.

5. The numerical controller according to claim 1, wherein the two rotation axes serve for table rotation and tool head rotation, individually, and the five-axis machine is a hybrid five-axis machine having one rotation axis for table rotation and the other for tool head rotation.

6. The numerical controller according to claim 1, wherein one of the two rotation axes is an inclined rotation axis.

7. The numerical controller according to claim 2, wherein both the two rotation axes serve for table rotation and the five-axis machine is a rotary-table five-axis machine.

8. The numerical controller according to claim 2, wherein both the two rotation axes serve for tool head rotation and the five-axis machine is a rotary-tool-head five-axis machine.

9. The numerical controller according to claim 2, wherein the two rotation axes serve for table rotation and tool head rotation, individually, and the five-axis machine is a hybrid five-axis machine having one rotation axis for table rotation and the other for tool head rotation.

10. The numerical controller according to claim 2, wherein one of the two rotation axes is an inclined rotation axis.

* * * * *